(12) United States Patent
Lamouche et al.

(10) Patent No.: US 10,323,669 B2
(45) Date of Patent: Jun. 18, 2019

(54) HOLDER DEVICE FOR BEING PRESENT AT THE SURFACE OF A PART MADE OF COMPOSITE MATERIAL

(71) Applicant: SAFRAN AIRCRAFT ENGINES, Paris (FR)

(72) Inventors: Damien Lamouche, Moissy-Cramayel (FR); Adrien Paixao, Moissy-Cramayel (FR); Hélène Elise Cécile Quillent, Moissy-Cramayel (FR); Kévin Coue, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/524,516

(22) PCT Filed: Oct. 30, 2015

(86) PCT No.: PCT/FR2015/052930
§ 371 (c)(1),
(2) Date: May 4, 2017

(87) PCT Pub. No.: WO2016/071610
PCT Pub. Date: May 12, 2016

(65) Prior Publication Data
US 2017/0328393 A1    Nov. 16, 2017

(30) Foreign Application Priority Data

Nov. 5, 2014  (FR) ..................................... 14 60671

(51) Int. Cl.
*F16B 5/12*    (2006.01)
*F16B 2/24*    (2006.01)
*F16B 5/06*    (2006.01)

(52) U.S. Cl.
CPC .............. *F16B 5/126* (2013.01); *F16B 2/245* (2013.01); *F16B 5/0685* (2013.01)

(58) Field of Classification Search
CPC ........ F16B 5/126; F16B 5/0685; F16B 2/245; F16B 2/5128; F16B 2/125; F16L 3/00; F16L 3/08
See application file for complete search history.

(56) References Cited

U.S. PATENT DOCUMENTS 2,523,185 A * 9/1950 Bedford, Jr. ............ F16B 2/245
248/71
2,541,828 A    2/1951 Peck
(Continued)

FOREIGN PATENT DOCUMENTS

DE             2044810 B  *  1/1972  ............ F16B 5/0685
DE    20 2005 008 570 U1     9/2005
(Continued)

OTHER PUBLICATIONS

International Preliminary Report on Patentability and the Written Opinion of the International Searching Authority as issued in International Patent Application No. PCT/FR2015/052930, dated May 9, 2017.
(Continued)

*Primary Examiner* — Victor D Batson
*Assistant Examiner* — Matthew J Sullivan
(74) *Attorney, Agent, or Firm* — Pillsbury Winthrop Shaw Pittman LLP (57) ABSTRACT

A holder device for being present at the surface of a first part made of composite material in order to enable a second part to be held to the first part, the holder device including a body made of composite material including a fiber structure and a matrix present in the pores of the fiber structure; and a holder member including a base and holder tabs extending
(Continued)

from either side of the base, the holder tabs being for defining a holding zone for holding the second part to the first part, the base of the holder device being present in the body, and the holder tabs projecting through a surface of the body.

20 Claims, 5 Drawing Sheets

(56) References Cited

U.S. PATENT DOCUMENTS

| | | | | | |
|---|---|---|---|---|---|
| 2,868,489 | A | * | 1/1959 | Calcut | F26B 5/0685 |
| | | | | | 24/304 |
| 3,287,690 | A | * | 11/1966 | Book | H01H 85/202 |
| | | | | | 248/316.7 |
| 3,288,505 | A | * | 11/1966 | Seckerson | F16B 5/0685 |
| | | | | | 24/304 |
| 4,202,090 | A | * | 5/1980 | Cook | B05B 13/0405 |
| | | | | | 248/49 |
| 4,266,596 | A | * | 5/1981 | Ban | B22D 19/0027 |
| | | | | | 164/108 |
| 4,840,333 | A | | 6/1989 | Nakayama | |
| 5,186,517 | A | * | 2/1993 | Gilmore | B60R 11/00 |
| | | | | | 24/295 |
| 6,916,220 | B2 | * | 7/2005 | Davey | B63B 35/7926 |
| | | | | | 114/127 |
| 7,025,645 | B1 | * | 4/2006 | Hsieh | B63B 35/793 |
| | | | | | 441/79 |
| 7,059,392 | B2 | * | 6/2006 | Kovac | F16B 2/08 |
| | | | | | 165/140 |
| 7,785,161 | B2 | * | 8/2010 | Wilkinson | B63H 16/12 |
| | | | | | 440/21 |
| 8,662,455 | B2 | * | 3/2014 | Hernandez | F16B 2/245 |
| | | | | | 248/222.12 |
| 8,727,288 | B2 | * | 5/2014 | Ruiz | H02G 3/30 |
| | | | | | 248/65 |
| 9,566,729 | B2 | * | 2/2017 | Longo | B29C 45/14008 |
| 2005/0098697 | A1 | | 5/2005 | Collins | |
| 2010/0078101 | A1 | * | 4/2010 | Styron | A45C 1/06 |
| | | | | | 150/137 |

FOREIGN PATENT DOCUMENTS

FR 2 863 587 A1 6/2005
WO WO-2016190758 A1 * 12/2016 ............. F16B 2/245

OTHER PUBLICATIONS

International Search Report as issued in International Patent Application No. PCT/FR2015/052930, dated Feb. 22, 2016.

* cited by examiner

HOLDER DEVICE FOR BEING PRESENT AT THE SURFACE OF A PART MADE OF COMPOSITE MATERIAL

CROSS REFERENCE TO RELATED APPLICATIONS

This application is the U.S. National Stage of PCT/FR2015/052930 filed Oct. 30, 2015, which in turn claims priority to French Application No. 1460671, filed Nov. 5, 2014. The contents of both applications are incorporated herein by reference in their entirety.

BACKGROUND OF THE INVENTION

The invention relates to devices for holding parts together.

In order to hold parts together, it is possible to fit one of the parts with a holder member that defines a holding zone in which the other part is to be received. The holder member may be fastened directly to the part by adhesive. Nevertheless, the adhesion of a holder member adhesively bonded directly to the surface of a composite material part is not necessarily completely satisfactory and it can happen that the holder member becomes unstuck.

There therefore exists a need to improve the adhesion of holder members to parts that are made of composite material, and in particular to aeroengine casings made of composite materials.

OBJECT AND SUMMARY OF THE INVENTION

To this end, in a first aspect, the invention provides a holder device for being present at the surface of a first part made of composite material in order to enable a second part to be held to the first part, the holder device comprising:
 a body made of composite material comprising a fiber structure and a matrix present in the pores of the fiber structure; and
 a holder member comprising a base and holder tabs extending from either side of the base, the holder tabs being for defining a holding zone for holding the second part to the first part, the base of the holder device being present in the body, and the holder tabs projecting through a surface of the body.

The invention thus consists in using a holder device in which the holder member is embedded in a body made of composite material. By way of example, the body may be made of an organic matrix composite (OMC) material or of a ceramic matrix composite (CMC) material. By way of example, when the body is made of organic matrix composite material, said body may present a matrix made of thermoplastic material that is obtained by molding, with the fiber structure constituting the reinforcement of the matrix. The body is for enabling the holder member to be fastened to the first part. The invention serves advantageously to obtain adhesion of the holder member to the first part that is improved compared with the situation in which the holder member is adhesively bonded directly to the first part, with this being as a result of the holder member being fastened to the first part via its body made of composite material.

In an embodiment, the base of the holder device may be draped between at least one first densified fiber ply and at least one second densified fiber ply, the second fiber ply presenting openings through which the holder tabs extend.

In particular, at least one third densified fiber ply with an opening may be present between the first fiber ply and the second fiber ply, the base of the holder member being received in the opening in the third fiber ply.

Such a configuration advantageously makes it possible to limit or even eliminate the extra thickness in the holder device associated with the thickness of the base of the holder member.

In a variant, the fiber structure may be a fiber structure obtained by three-dimensional weaving.

In an embodiment, the holder tabs may be configured to enable the second part to be clipped to the first part. In a variant, the holder tabs may be configured to define a clamping collar suitable for holding the second part by clamping it to the first part.

In an embodiment, the device may also include one or more centering pegs present on the surface of the device opposite from the surface through which the holder tabs pass.

In an embodiment, the holder member is generally in the form of a spring clip.

The present invention also provides a part made of composite material and presenting at its surface a holder device as defined above.

The part may constitute an aeroengine casing.

The holder device may be fastened to the part by a layer of adhesive.

The present invention also provides an assembly comprising a first part as defined above, and a second part held to the first part using the holder device.

By way of example, the second part may be a pipe, a cable, or a fire-retardant quilt.

The present invention also provides an aircraft fitted with an assembly as defined above.

The present invention also provides a method of fabricating a holder device as defined above, the method comprising the following steps:
 a) applying pressure to at least one fiber structure present in a mold cavity, the fiber structure comprising:
  the holder member; and
  at least one first impregnated fiber ply and at least one second impregnated fiber ply, the base of the holder member being present between the first and second impregnated fiber plies, the second impregnated fiber ply presenting openings through which the holder tabs pass, a central portion of the second impregnated fiber ply facing the base of the holder member, and side portions of the second impregnated fiber ply being situated on either side of the central portion;
 the pressure applied during step a) being exerted on the central portion and on the side portions of the second impregnated fiber ply; and
 b) applying heat treatment in order to form a matrix in the pores of the first and second plies and thereby obtaining the holder device, the pressure applied during step a) being maintained during step b).

Such a method is advantageous since it makes it possible to obtain uniform pressing of the plies against the side and central portions of the holder device while limiting pore phenomena and dry zones. This advantageously makes it possible to obtain good planeness for the draping of the holder member after heat treatment has been applied.

In an implementation, the fiber structure may be present between a support and a bottom block through which the holder tabs extend, the bottom block applying pressure against the side portions of the second impregnated fiber ply during step a).

In an implementation, the bottom block may be formed by assembling together two half-blocks, the two half-blocks being separable from each other on either side of the holder tabs while unmolding the resulting holder device.

In an implementation, the mold cavity may be evacuated, at least during step b).

In an implementation, the fiber structure may also include at least one impregnated third fiber ply with an opening, which third fiber ply is present between the first fiber ply and the second fiber ply, with the base of the holder member being received in the opening in the third fiber ply.

In an implementation, the fiber structure may be present on a support, with the face of the support that faces the fiber structure presenting a plurality of blind holes.

Such an implementation is advantageous since it makes it possible, for example, to form centering pegs on a face of the holder device as a result of the composition that impregnates the plies flowing into the blind holes during fabrication of the holder device.

In an implementation, a plurality of fiber structures may be processed simultaneously.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

Figure 1:
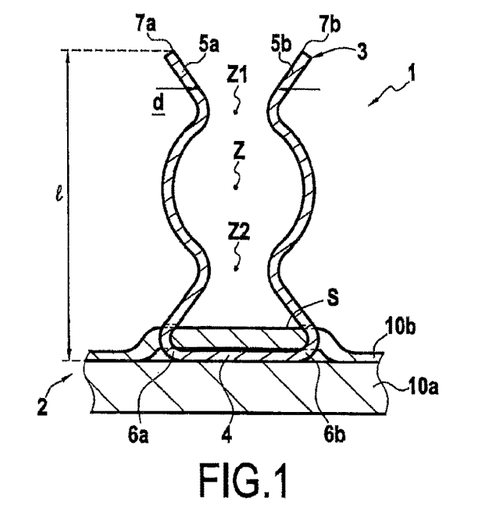
FIG. 1 is a diagram of a first element of a holder device of the invention.

FIG. 1 shows a first example of a holder device 1 of the invention. The holder device 1 of FIG. 1 comprises a body 2 made of composite material comprising a fiber structure having a matrix present in its pores. By way of example, the body may be a composite material having an organic matrix or a composite material having a ceramic matrix. The holder device 1 also includes a holder member 3 comprising a base 4 and holder tabs 5a and 5b extending from either side of the base 4. The holder member 3 may be made of a metal material.

Figure 2:
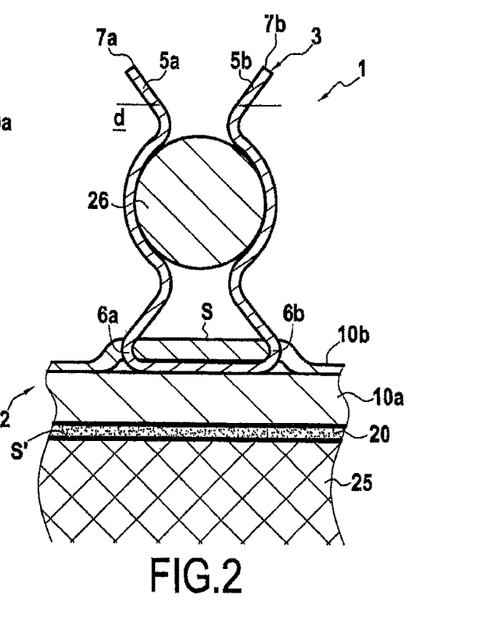
FIG. 2 is a diagram of a part of the invention presenting the FIG. 1 holder device at its surface.

In the example shown in FIG. 1, the base 4 of the holder member 3 is present between first densified fiber plies 10a and second densified fiber plies 10b of the body 2, the second fiber plies 10b presenting openings through which the holder tabs 5a and 5b extend. On going towards the base 4, each holder tab 5a or 5b forms a bend portion 6a or 6b and projects through the surface S of the body 2. The holder device 1 is to be present at the surface S' of a first part 25 that is made of composite material. Such a configuration is shown in FIG. 2, in which the holder device 1 is fastened to the surface S' of the first part 25 via a layer of adhesive 20. Nevertheless, such a configuration is not essential, as explained below. For example, the first part may be an aeroengine casing, e.g. made of composite material having an organic matrix or of composite material having a ceramic matrix. The holder tabs 5a and 5b of the device 1 define a holding zone Z in which a second part 26 is received in order to be held to the first part 25.

In the example shown in FIG. 1, the holder device 1 is in the general form of a spring clip. In other words, on going from the ends 7a and 7b of the holder tabs 5a and 5b towards the surface S of the body 2, the distance d between the tabs 5a and 5b begins by decreasing, then increases, and then decreases.

As shown in FIG. 1, the major portion (more than 50%) of the length l of the holder tabs 5a and 5b projects from the body 2.

The holder tabs 5a and 5b in this configuration are configured to clip onto the second part 26. To do this, the second part 26 is inserted between the tabs 5a and 5b via the ends 7a and 7b going towards the surface S until becoming clipped in the zone Z. In the example shown, the zone Z is present between two zones $Z_1$ and $Z_2$ in which the distance d between the tabs 5a and 5b is at a minimum. This clipping enables the second part to be held on the first part by using the holder device.

Figure 3:
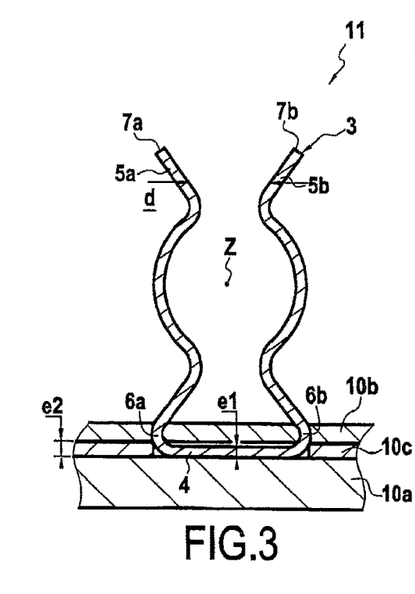
FIGS. 3 to 6 are diagrams showing variants of the holder device of the invention.

FIG. 3 shows a variant of the holder device 11 of the invention. In the same manner as FIG. 1, the base 4 of the holder member 3 is present between first densified fiber plies 10a and second densified fiber plies 10b, the second densified fiber plies presenting openings through which the holder tabs 5a and 5b extend. In the example of FIG. 3, at least one third densified fiber ply 10c is present between the second fiber plies 10b and the first fiber plies 10a. The third fiber ply 10c presents a through opening in which the base 4 of the holder member is received. The thickness $e_1$ of the base 4 of the holder member may be substantially equal to the thickness $e_2$ of the third fiber ply 10c. In this configuration, the holder device 11 that is obtained does not present any extra thickness associated with the thickness of the base 4 of the holder member 3. In a variant, the thickness $e_1$ of the base 4 may be less than or greater than the thickness $e_2$.

Figure 4:
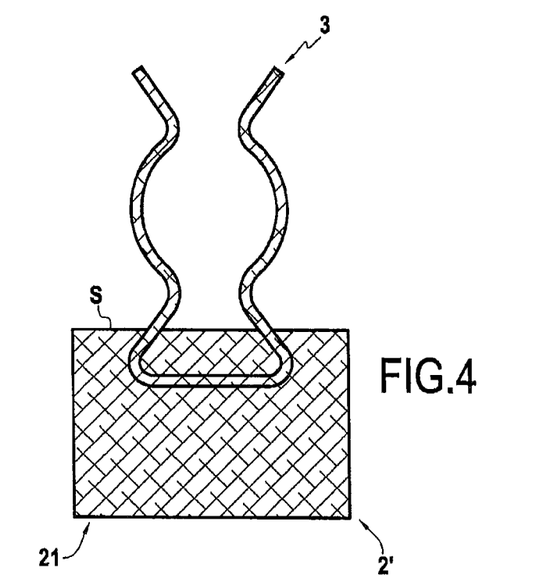

FIG. 4 shows another example of a holder device 21 of the invention in which the body 2' comprises a fiber structure obtained by three-dimensional weaving, e.g. by multilayer weaving. In order to obtain such a structure, yarns may be woven directly around the holder member 3.

The term "three-dimensional weaving" or "3D weaving" is used herein to designate weaving in which at least some of the warp layers interlink weft layers over a plurality of weft layers.

The term "multilayer weaving" is used herein to designate 3D weaving having a plurality of weft layers in which the base weave of each layer is equivalent to a conventional 2D weave, such as a plain, satin, or twill type weave, but with certain points of the weave linking weft layers together.

Figure 5:
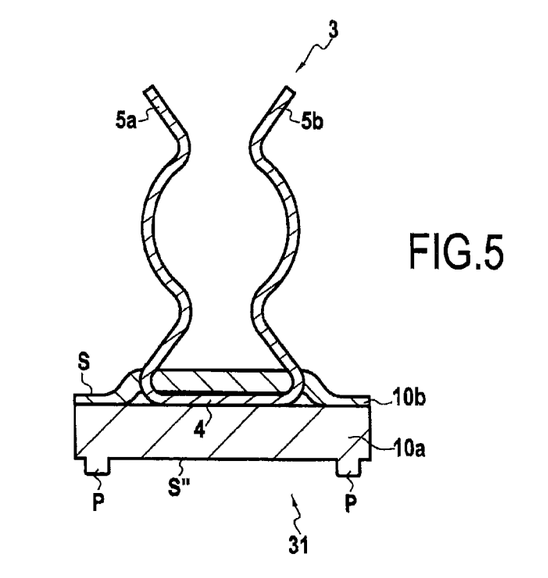

FIG. 5 shows another example of a holder device 31. In this example, centering pegs P are present on the surface S" of the device 31 opposite from its surface through which the tabs 5a and 5b extend. The presence of these centering pegs P makes it easy to position the holder device 31 properly on the first part, and also to avoid the holder device 31 turning once it is in position on the first part. As mentioned above, the pegs P may be obtained by molding during fabrication of the holder device. In a variant, the pegs P may be constituted by separate elements fitted in the plies.

Figure 6:
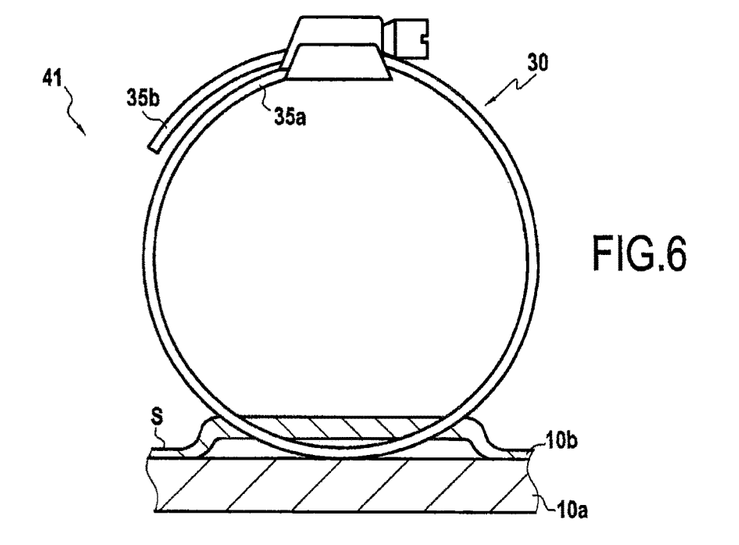

In the variant shown in FIG. 6, the device 41 presents a holder member 30 having holder tabs 35a and 35b that are configured to define a clamping collar suitable for holding the second part to the first part by clamping around the second part. By way of example, the clamping collar formed by the tabs 35a and 35b may be of the Serflex type.

Figure 7:
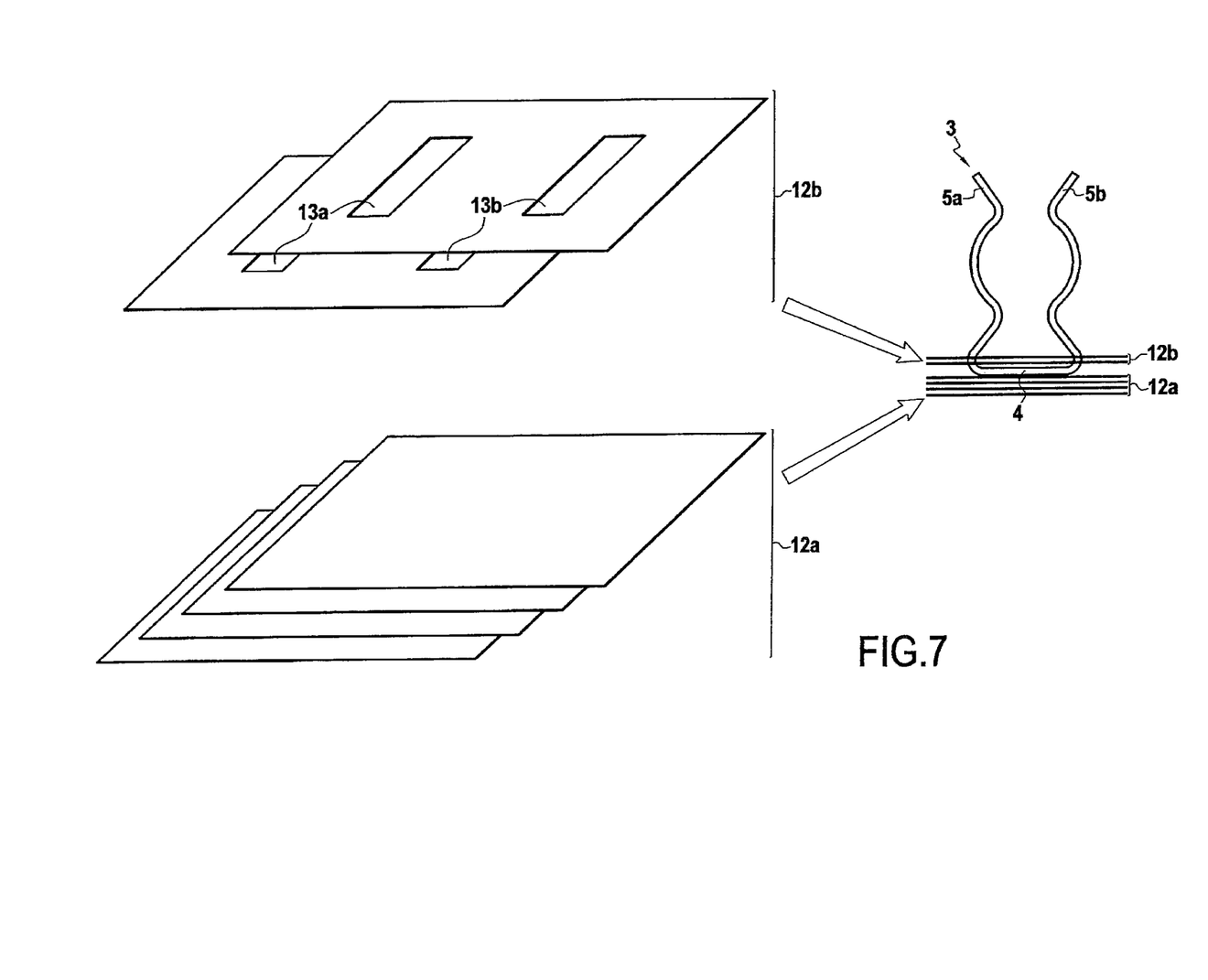
FIGS. 7 to 9 are diagrams showing the implementation of methods of fabricating a holder device of the invention.

There follows a description of FIG. 7 concerning the fabrication of a holder device 1 as shown in FIGS. 1 and 2. Initially, the holder member 3 is placed on first fiber plies 12a that are preimpregnated with a resin. Thereafter, second fiber plies 12b that are preimpregnated with a resin are superposed thereon. As shown, the second fiber plies 12b present openings 13a and 13b through which the holder tabs extend after the second fiber plies 12b have been put into position on the first fiber plies 12a. FIG. 7 shows an example in which a plurality of first plies 12a and a plurality of second plies 12b are used. It would not go beyond the ambit of the invention for a single first ply 12a and/or a single second ply 12b to be used. Once the second plies 12b are in position on the first plies 12a, pressure may be applied to the first and second plies 12a and 12b. Heat treatment is then applied while maintaining the pressure in order to polymerize the resin and form a matrix in the pores of the first and second plies 12a and 12b so as to bond these plies 12a and 12b together. At the end of such heat treatment, a holder device 1 of the kind shown in FIGS. 1 and 2 is obtained. Adhesive may optionally be used to improve the fastening of the holder device to the first and second plies.

FIG. 7 shows the situation in which the plies 12a and 12b are already impregnated with resin prior to draping the holder member. In a variant, it is possible to begin by placing the holder member on first fiber plies that are dry and then to position the second fiber plies, while dry, on the dry first fiber plies. Resin can be then applied to the first and second plies using an applicator, e.g. a roller. The method may then continue as described above in order to obtain a holder device (applying pressure and heat treatment to polymerize the resin while the pressure is maintained).

The example shown in FIG. 7 also shows the use of fiber plies 12a and 12b that are rectangular in shape when seen from above. It would not go beyond the ambit of the invention for these plies to be of some other shape, e.g. square or round.

The person skilled in the art knows how to select the number, the shape, and the chemical nature of the plies used as a function of the intended application.

With reference to FIG. 2, it is stated that the holder device 1 may be fastened to the surface of the first part 25 by adhesive. However that is not essential. Specifically, when impregnated first fiber plies are used, it is possible to place them on a blank for the first part, which blank comprises a fiber preform having resin present in its pores, and then to proceed with the heat treatment. The resulting heat treatment serves to polymerize the resin present in the first fiber plies and in the blank, thereby enabling the holder device to be secured to the first part. Under such circumstances, it is thus possible to avoid using adhesive for fastening the holder device to the first part.

Figure 8:
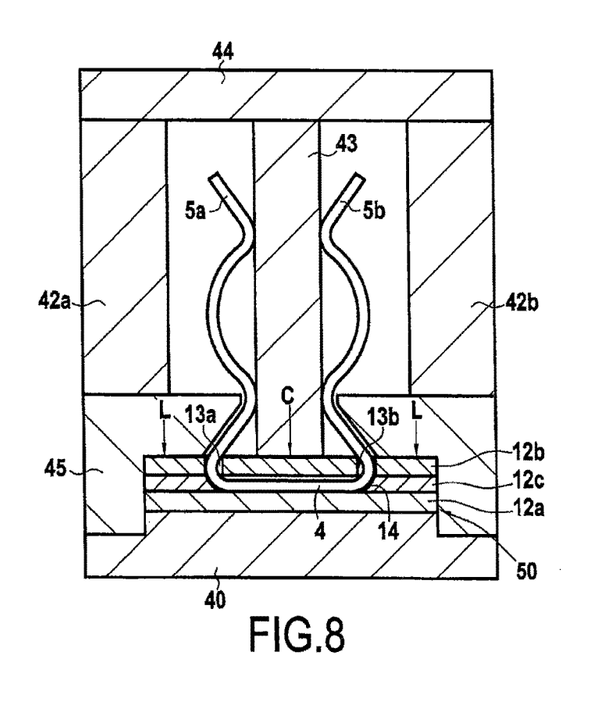

FIG. 8 shows an example of a method of fabricating a holder device of the invention that makes use of a mold defining a mold cavity in which a fiber structure 50 is present. In this fiber structure 50, the base 4 of the holder member is draped between a first fiber ply 12a and a second fiber ply 12b. As shown, a third fiber ply 12c is present between the first and second fiber plies 12a and 12b. As explained above, the third fiber ply presents a through opening 14 in which the base 4 of the holder member is received. This structure 50 rests on a rigid support 40. In this method, pressure is applied to the fiber structure 50 via a central portion C of the second ply 12b facing the base 4 of the holder member and via the side portions L of the second ply 12b situated on either side of the central portion C. Specifically, the central block 43 applies pressure against the central portion C, while the bottom block 45 applies pressure against the side portions L. The central block 43 presses against the plies at the center of the holder member. The central block 43 may be made of a metal material possibly coated with a non-stick coating, at least in its zones that are to come into contact with the holder member. In a variant, the central block 43 may be made of polytetrafluoroethylene (Teflon®). The bottom block 45 is machined so as to present a shoulder for receiving the holder member. The bottom block 45 may be made of a metal material, possibly coated in a non-stick coating. The side walls 42a and 42b and the top wall 44 of the mold are present in order to close the mold and seal it off from the outside medium. While pressure is being maintained, heat treatment is applied so as to polymerize the resin impregnating the plies 12a, 12b, and 12c, in order to obtain the holder device. It is possible to apply a vacuum to the mold (both in its high portion and its low portion) while polymerization is taking place.

Figure 9:
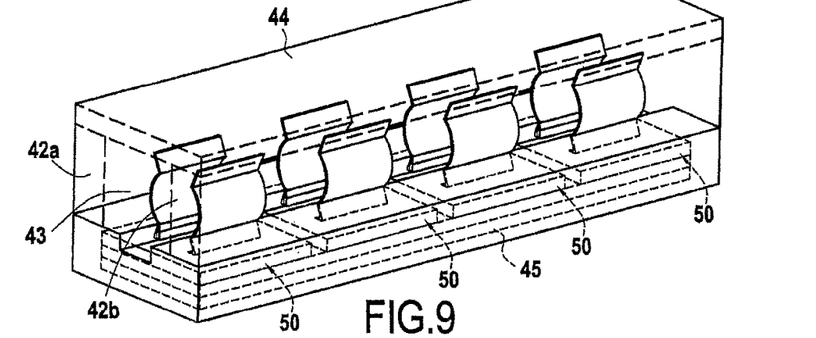

FIG. 9 is a perspective view of a mold suitable for fabricating the holder device of the invention and presenting a cross-section as shown in FIG. 8. As shown, a plurality of fiber structures 50 are present in the mold cavity and they are processed simultaneously. The mold shown is for processing four fiber structures 50, and it would naturally not go beyond the ambit of the invention if there were some other number of fiber structures present in the mold.

Figure 10:
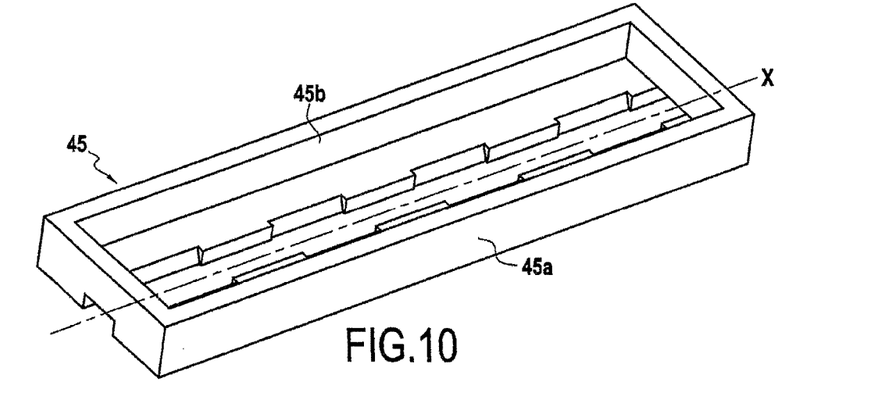
FIGS. 10 and 11 show details of elements suitable for use during fabrication of the holder device of the invention.

FIG. 10 shows a detail of the bottom block 45. In this embodiment, the bottom block 45 is made by assembling together two half-blocks 45a and 45b, the two half-blocks 45a and 45b being separable from each other on opposite sides of the axis X. In this embodiment, the half-blocks 45a and 45b are separable on either side of the holder tabs during unmolding of the resulting holder device. Such an embodiment is advantageous since it facilitates inserting the various elements into the mold and also unmolding of the resulting holder device. Once the two half-blocks have been put into place, they are clamped together. Naturally, it is possible in a variant to make use of a bottom block that is constituted by a single piece.

Figure 11:
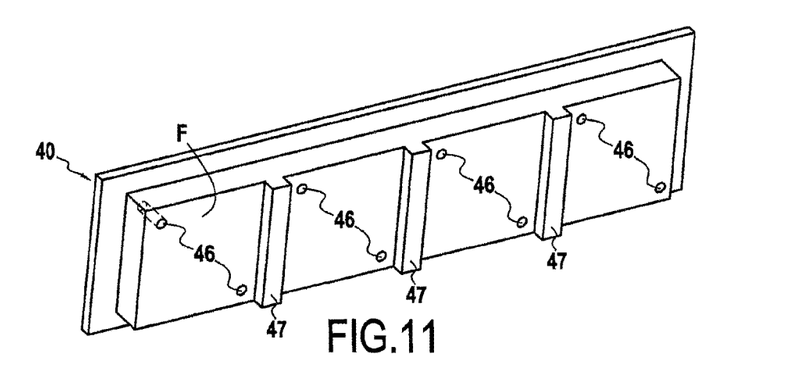

FIG. 11 shows a detail of the support 40 on which the fiber structure rests. The face F of the support 40 that is to be placed facing the fiber structure is provided with blind holes 46 for making centering pegs by molding the resin that impregnates the plies. During the method of fabricating the holder device, the resin flows into the blind holes 46 so as to form the centering pegs once the resin has polymerized. The face F also includes separator walls 47 for defining different zones for placing fiber structures. In a variant, it is possible to use a support in which the face that is to be present facing the fiber structure does not present any blind holes nor any separator walls.

The term "lying in the range . . . to . . . " should be understood as including the bounds.

The invention claimed is:

1. A holder device for being present at the surface of a first part made of composite material in order to enable a second part to be held to the first part, the holder device comprising:
   a body made of composite material comprising a fiber structure and a matrix present in the pores of the fiber structure; and
   a holder member comprising a base and holder tabs extending from either side of the base, the holder tabs being for defining a holding zone for holding the second part to the first part, the base of the holder device being embedded in the body such that the composite material of the body fully covers the base between the holder tabs, and the holder tabs projecting through an external surface of the body.

2. A device according to claim 1, wherein the base of the holder device is draped between at least one first densified fiber ply and at least one second densified fiber ply, the second fiber ply presenting openings through which the holder tabs extend.

3. A device according to claim 2, wherein at least one third densified fiber ply with an opening is present between the first fiber ply and the second fiber ply, the base of the holder member being received in the opening in the third fiber ply.

4. A device according to claim 1, wherein the fiber structure is a fiber structure obtained by three-dimensional weaving.

5. A device according to claim 1, wherein the holder tabs are configured to enable the second part to be clipped to the first part.

6. A device according to claim 1, wherein the holder tabs are configured to define a clamping collar suitable for holding the second part by clamping it to the first part.

7. A device according to claim 1 further comprising one or more centering pegs present on a surface of the device opposite from the external surface through which the holder tabs pass.

8. A device according to claim 1, wherein the holder member is generally in the form of a spring clip.

9. A part made of composite material and presenting at its surface a holder device according to claim 1.

10. A part according to claim 9, wherein the part constitutes an aeroengine casing.

11. An assembly comprising a first part according to claim 9, and a second part held to the first part using the holder device.

12. An aircraft fitted with an assembly according to claim 11.

13. A method of fabricating and placing a holder device at a surface of a first part made of composite material in order to enable a second part to be held relative to the first part, the holder device comprising: a body and a holder member; the body being made of composite material comprising at least one fiber structure comprising at least one first densified fiber ply and at least one second densified fiber ply and a matrix present in pores of the fiber structure; the holder device comprising a holder member comprising a base and holder tabs extending from either side of the base, the holder tabs defining a holding zone for holding the second part to the first part, the base of the holder device being positioned such that the composite material of the body fully covers the base between the holder tabs and the base is draped between at least one first densified fiber ply and at least one second densified fiber ply, wherein the holder tabs of the holder device project through an external surface of the body and extend through openings of the second densified fiber ply, the method comprising the following steps:

a) applying pressure to a structure present in a mold cavity, the structure comprising:

the holder member; and at least one first impregnated fiber ply and at least one second impregnated fiber ply, the base of the holder member being present between the first and second impregnated fiber plies, wherein the holder tabs are passed through openings of the second impregnated fiber ply, a central portion of the second impregnated fiber ply faces the base of the holder member, and side portions of the second impregnated fiber ply are situated on either side of the central portion;

wherein the pressure applied during step a) is exerted on the central portion and on the side portions of the second impregnated fiber ply; and b) applying heat treatment in order to form the matrix in the pores of the first and second plies and thereby obtain the holder device, wherein the pressure applied during step a) is maintained during step b).

14. A method according to claim 13, wherein the structure is present between a support and a bottom block through which the holder tabs extend, the bottom block applying pressure against the side portions of the second impregnated fiber ply during step a).

15. A method according to claim 14, wherein the bottom block is formed by assembling together two half-blocks, the two half-blocks being separable from each other on either side of the holder tabs while umnolding the resulting holder device.

16. A method according to claim 13, wherein the mold cavity is evacuated, at least during step b).

17. A method according to claim 13, wherein the at least one first impregnated fiber ply and the at least one second impregnated fiber ply are impregnated with resin prior to placement in the mold cavity.

18. A method according to claim 13, wherein the method further comprises:

before step a):

placing the holder member on at least one first fiber ply;

positioning at least one second fiber ply on the at least one first fiber ply; and applying resin to the at least one first fiber ply and the at least one second fiber play using an applicator.

19. A method according to claim 13, further comprising making one or more centering pegs on a surface of the holder device that opposite from the external surface from which the holder tabs extend, by molding resin that flows from the at least one first impregnated fiber ply and the at least one second impregnated fiber ply and into holes of the mold cavity.

20. A device according to claim 1, wherein the holder device is fastened to the surface of the first part via a layer of adhesive.

* * * * *